United States Patent [19]

Olson

[11] Patent Number: 5,038,869
[45] Date of Patent: Aug. 13, 1991

[54] FATIGUE-RESISTANT SPINDLE END

[75] Inventor: Gene E. Olson, Kenosha, Wis.

[73] Assignee: Snap-on Tools Corporation, Kenosha, Wis.

[21] Appl. No.: 383,749

[22] Filed: Jul. 24, 1989

[51] Int. Cl.$^5$ .......................................... B25D 17/00
[52] U.S. Cl. .................................. 173/93; 081/177.85
[58] Field of Search ...................... 173/93; 81/177.85; 403/298, 383, 361

[56] References Cited

U.S. PATENT DOCUMENTS

| | | | |
|---|---|---|---|
| D. 260,355 | 8/1981 | Buzzell | 81/177.85 |
| 1,371,933 | 3/1921 | Rebman | 81/177.85 |
| 2,223,727 | 12/1940 | Hömen | 255/41 |
| 2,724,299 | 11/1955 | Amtsberg | 81/52.4 |
| 2,784,818 | 3/1957 | Maurer | 192/30.5 |
| 2,786,376 | 3/1957 | Roggenburk | 81/52.3 |
| 2,801,718 | 8/1957 | Kaman | 192/30.5 |
| 2,851,295 | 9/1958 | Chaffee | 81/177.85 |
| 3,174,597 | 3/1965 | Schaedler et al. | 192/30.5 |
| 3,952,814 | 4/1976 | Gelfand et al. | 173/93 |
| 4,344,340 | 8/1982 | Erickson | 81/177.85 |
| 4,537,100 | 8/1985 | Palm | 81/177.85 |
| 4,848,196 | 7/1989 | Roberts | 81/177.85 |

OTHER PUBLICATIONS

American National Standard Institute ANSI B107.4–1973.
Dieter, G. E., *Mechanical Metallurgy*, Sec. 12-7, Effect of Stress Concentration on Fatigue, 1961.

*Primary Examiner*—Douglas D. Watts
*Assistant Examiner*—Scott A. Smith
*Attorney, Agent, or Firm*—Emrich & Dithmar

[57] ABSTRACT

The fatigue-resistant spindle end of the invention is an elongated body having an axis of rotation. The spindle end comprises a drive engaging portion at one end, a male tool engaging tang at the other end, and a torque transfer section disposed therebetween. The torque transfer section includes a cylindrical journal portion and a frustoconical transition portion. The transition portion retains the geometric characteristics of both the tang and the cylindrical journal portion and blends those geometric characteristics so as to eliminate sharp discontinuities which may function as stress concentrators. In one embodiment of the invention, a stop barrel is also included to prevent a socket or other tool from engaging the transition portion.

37 Claims, 3 Drawing Sheets

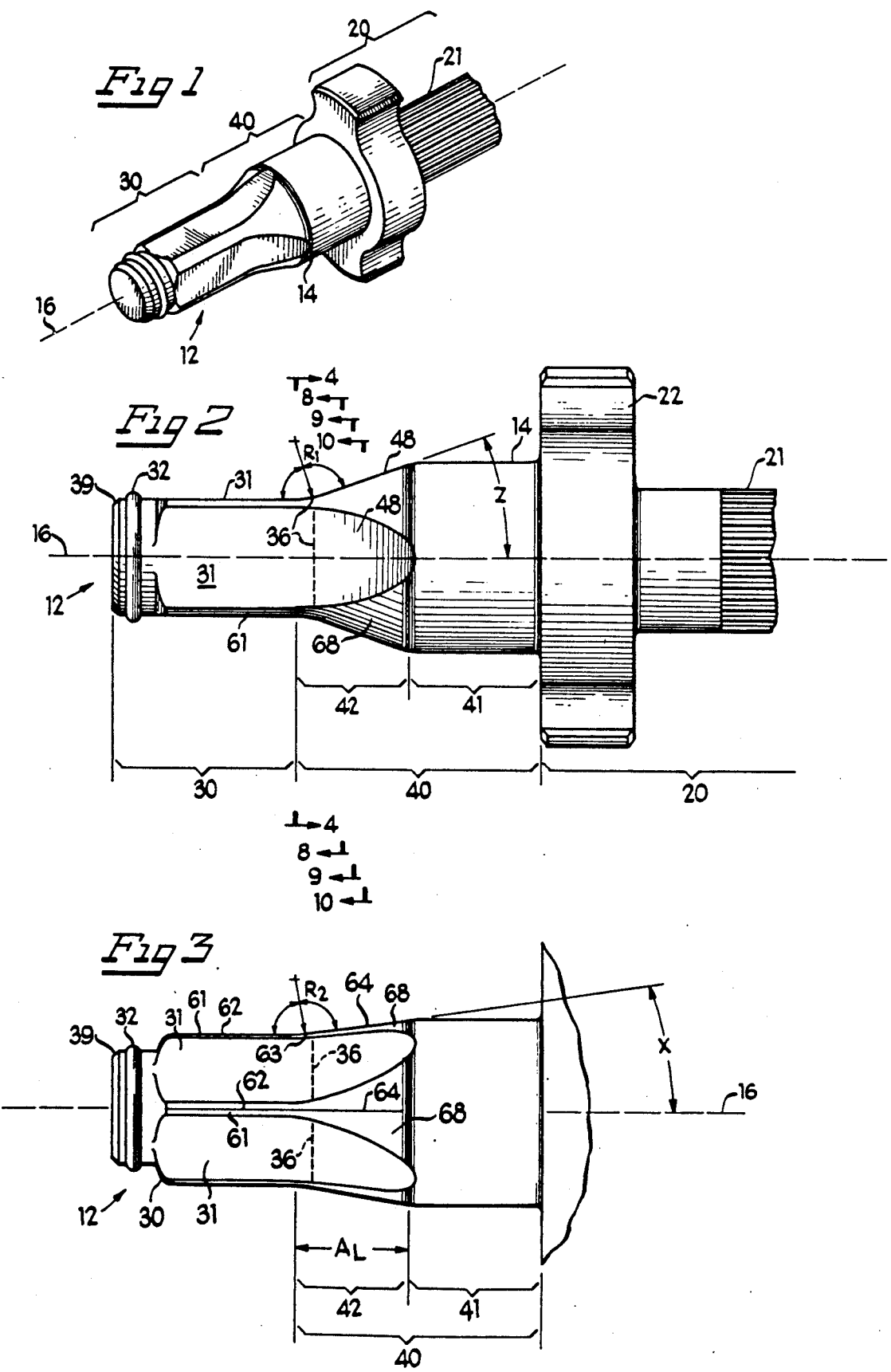

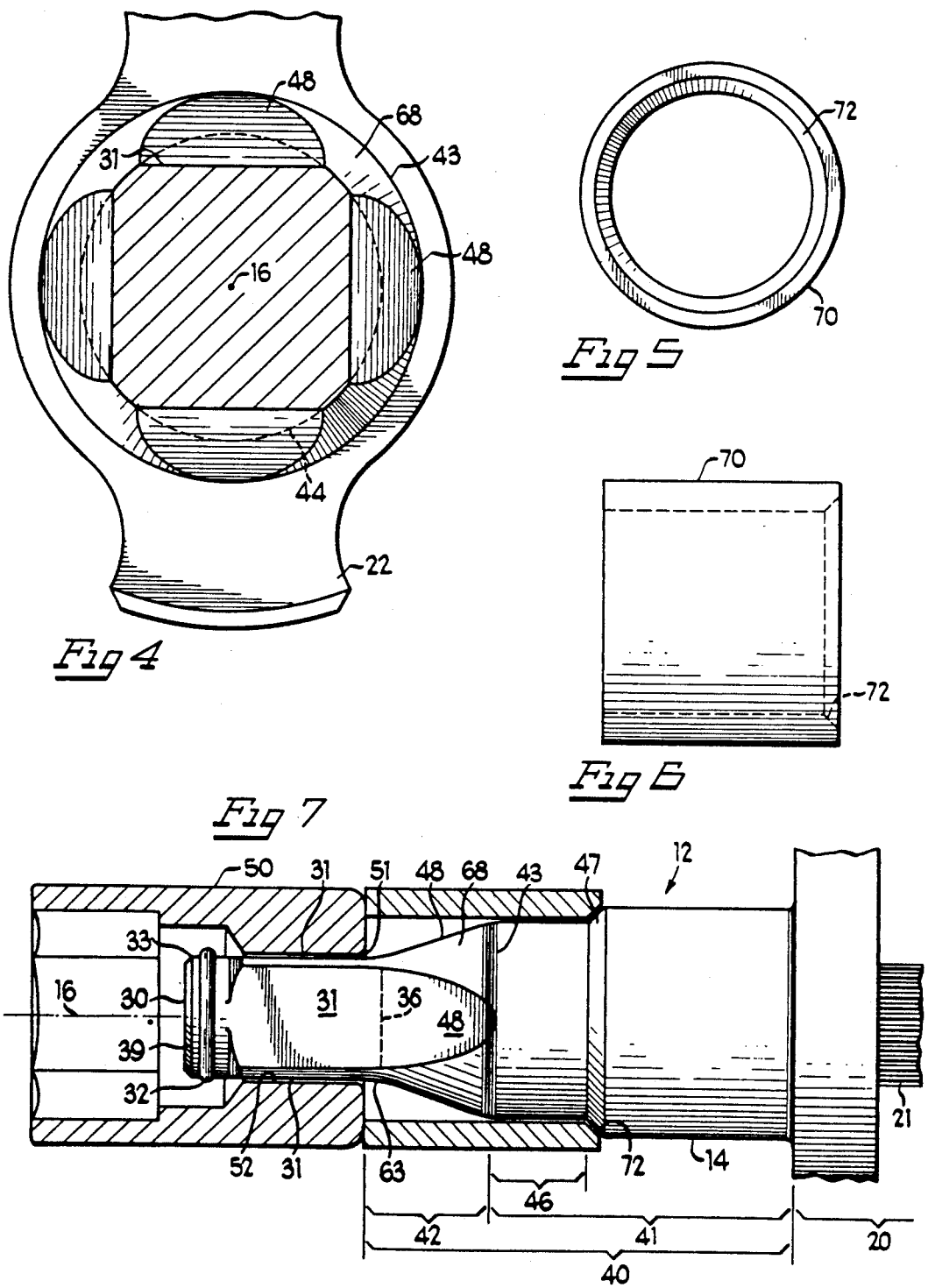

FATIGUE-RESISTANT SPINDLE END

BACKGROUND OF THE INVENTION

The present invention relates generally to spindle ends employed in rotary tool drives and more particularly to a fatigue-resistant spindle end which is especially well suited for rotary-impact tool drives such as air, electric and hydraulic impact wrenches.

Spindle ends are used on portable air, electric and hydraulic tool drives for tools such as sockets. Although reference is made herein to sockets, it will be understood that other tools, such as rotary sanders, may be used in connection with the invention. A spindle end is generally in the shape of an elongated body which has a longitudinal axis of rotation, and comprises a means for engaging a rotary drive means (drive engaging means) at one end of the body, a male tool engaging tang at the other end of the body and a torque transfer section between the drive engaging means and the male tang. The torque transfer section and male tang are usually integrally formed and coaxially disposed about the axis of rotation. In a plane normal to the axis of rotation, the male tang has a substantially square cross-sectional configuration. The tang is adapted for being received in a substantially square female receptacle, of like dimensions, which is formed in the socket. A power source, such as an electric or air-driven motor supplies a rotational force or torque to the drive engaging means, which torque is transferred to the tang, and thereby to the socket, through the torque transfer section. The torque transfer section generally includes a cylindrical, journal portion which is received in a journal bearing so that the spindle end is axially supported but free to rotate.

The rotary drive means may apply a substantially constant rotational force or torque or an intermittent, high magnitude torque. In the latter case, the rotary drive means is generally referred to as a rotary-impact drive means and includes an impact mechanism. It will be understood by those skilled in the art that the drive engaging means is then constructed accordingly.

Spindle ends are generally designated by the nominal dimensions of the substantially square cross-sectional configuration of the male tang. Thus, a spindle end wherein the cross-sectional configuration has nominal dimensions of ½ inch, is generally referred to as a "half-inch drive" spindle end. Likewise, such a spindle end is used to engage a socket having a female receptacle of like dimensions, referred to as a "half-inch drive" socket. It will be understood that the recited dimensions are only nominal and that the female receptacle must be made slightly larger than the tang in order for the tang to be received therein.

Prior art spindle ends in portable power tools are subject to frequent fatigue failures. Fatigue is a phenomenon which leads to fracture in a load-bearing member under repeated or fluctuating stresses, even though those stresses may have a maximum value substantially less than the tensile strength of the member. Fatigue fractures generally initiate at some point of geometric discontinuity in the member. The discontinuity may be present due to the geometric design of the member, or as a result of wear or a manufacturing defect. Regardless of the source, the discontinuity serves to concentrate or locally raise the stress level in the load-bearing member. Thus, fatigue fractures are progressive in nature and generally begin as minute cracks at the point of discontinuity. The embryonic cracks grow incrementally under the action of cyclic stress and, upon reaching a critical size, failure of the loadbearing member can occur in a catastrophic manner.

The incidence of fatigue failures in spindle ends is particularly pronounced in those tools which have rotary-impact drives. Such tools are frequently used in applications where it is difficult to remove a fastener with constant torque means. For instance, air-driven impact wrenches are used to remove the lug nuts which secure automobile wheels. The lug nuts, and the studs associated therewith, are subjected to salt, moisture and other corrosive conditions. A rotary-impact-driven wrench can apply a large torque to the lug nut through the stored momentum of a rotating impact mechanism in the air wrench. The repeated application of this torque helps to overcome the restraining force which results from the products of corrosion that form on the lug nuts and studs.

A sudden, catastrophic failure of a spindle end in a rotary impact-driven wrench results in a very dangerous condition. Because the impact forces are high, the socket and broken portion of the spindle end can be propelled at high speed, which may cause injury to the operator or a bystander.

Prior art spindle ends have been constructed so as to include an abrupt change in geometry between the substantially square cross-sectional configuration of the male tang and the cylindrical configuration of the journal portion of the torque transfer section. The shoulder created by this abrupt change in geometry functions as a stress concentrator and frequently serves as the site for initiating a fatigue fracture. In the prior art, a fillet of specified radius has been employed to lessen the severity of the stress concentration due to the shoulder at the tang/journal portion juncture. Thus, design parameters for spindle ends in rotary tool drives have been promulgated by the American National Standard Institute ("ANSI") under ANSI specification B107.4. The ANSI specifications include the range of permissible radii of curvature for the shoulder fillets in spindle ends. It has been found, however, that adherence to the ANSI specifications still results in a substantial number of fatigue failures in spindle ends, particularly in applications involving impact wrenches.

Stress concentration may also occur as a result of engagement between the male tang and the tools received thereon. In prior art spindle ends, the shoulder at the tang/journal portion juncture of the spindle end also acts as a stop (in the axial direction) for the engagement of the tool on the tang. Because the female receptacle in the tool is necessarily slightly larger than the dimensions of the tang, the area of engagement between the spindle end and tool usually includes the shoulder fillet. Notches are caused by repeated incidences of such engagement and are exacerbated by the load between the tool and tang. In other words, because the tool engages the tang at the fillet, the load is borne primarily at the fillet and not evenly distributed over the surface of the tang.

Thus, a large load is carried directly at the area of stress concentration which is due to both the change in geometry at the shoulder of the spindle end and the notches formed therein.

BRIEF SUMMARY OF THE INVENTION

It is therefore an object of the present invention to provide a spindle end for rotary tool drives which has increased fatigue resistance, as compared to prior art spindle ends, particularly in applications which employ impact drives.

It is another object of the present invention to provide a spindle end for rotary tool drives which has a transition portion in the torque transfer section that increases the fatigue resistance of the spindle end.

Yet another object of the invention is to provide a spindle end for rotary tool drives which includes a stop means to prevent a driven tool, such as a socket, from engaging the spindle end within the transition portion of the torque transfer section.

Still another object of the invention is to provide a fatigue-resistant spindle end for rotary tool drives which can be easily manufactured.

The fatigue-resistant spindle end of the invention is an elongated body having a longitudinal axis of rotation and comprising: a drive engaging means for engaging a rotary drive means at one end of said body; a male tool engaging tang at the other end of said body; a torque transfer section disposed between said drive engaging means and said male tang; said torque transfer section and said male tang being integrally formed, coaxially disposed and exhibiting four-fold symmetry about said axis of rotation; said torque transfer section including a cylindrical journal portion and a transition portion; said transition portion being disposed between said journal portion and said male tang; said male tang having a generally square cross-sectional configuration, transverse to said axis of rotation; said male tang having a predetermined nominal size defined by said square cross-sectional configuration; said transition portion having a cross-sectional configuration, transverse to said axis of rotation, which varies with axial position from substantially square adjacent said tang to substantially circular adjacent said journal portion; and said transition portion having an axial length greater than or equal to about one-half of said predetermined nominal tang size.

Additional embodiments of the fatigue-resistant spindle end of the invention include a stop means which cooperates with the male tang and a tool which is engaged with the tang, so that the area of engagement between the tool and spindle end does not include the transition portion.

The invention consists of certain novel features and a combination of parts hereinafter fully described, illustrated in the accompanying drawings, and particularly pointed out in the appended claims, it being understood that various changes in the details may be made without departing from the spirit or sacrificing any of the advantages of the present invention.

BRIEF DESCRIPTION OF THE DRAWINGS

FIG. 1 is a fragmentary perspective view of the fatigue-resistant spindle end of the invention, adapted for use in a rotary-impact tool drive;

FIG. 2 is a fragmentary side elevation of the spindle end shown in FIG. 1, on an enlarged scale;

FIG. 3 is a fragmentary side elevation of the spindle end shown in FIG. 2 but rotated 45° about its longitudinal axis, the axis of rotation;

FIG. 4 is an enlarged, fragmentary cross-sectional front elevation of the spindle end shown in FIG. 2 taken at line 4—4;

FIGS. 5 and 6 are rear and side elevations, respectively, of a barrel portion of one embodiment of stop means employed with the spindle end of the invention;

FIG. 7 is a fragmentary, side elevation of the spindle end of the invention, similar to FIG. 2 but showing a longitudinal cross section of the barrel portion of the stop means illustrated in FIGS. 5 and 6, cooperatively associated with the spindle end;

DESCRIPTION OF THE PREFERRED EMBODIMENT

Figure 8:
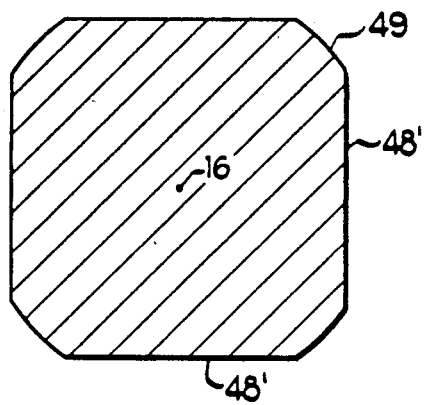
FIGS. 8, 9 and 10 are enlarged, cross-sectional front elevations of the transition portion of the spindle end shown in FIG. 2, respectively taken at lines 8—8, 9—9 and 10—10.

Referring now to the drawings, and in particular to FIG. 1, there is illustrated the fatigue-resistant spindle end of the present invention, generally indicated by reference numeral 12. The spindle end of the invention 12 is an elongated body 14 which has a longitudinal axis of rotation 16 and comprises a drive engaging means 20 at one end of the body 14, a male tool engaging tang 30 at the other end of the body and a torque transfer section 40 disposed between the drive engaging means 20 and the male tang 30.

The male tang 30 and torque transfer section 40 are preferably integrally formed, and are coaxially disposed about the axis of rotation 16. It is also preferable that each of the aforementioned members exhibits at least twofold symmetry about axis 16 so that rotation of the spindle end 12 is balanced. The drive engaging means 20 may also exhibit two-fold symmetry and be integrally formed and coaxially disposed with the tang 30 and torque transfer section 40. It is not unusual, however, for the drive engaging means 20 to be asymmetrical about the axis of the rotation. In such case the rotary drive means which engages the same is generally counter-balanced to offset the asymmetry.

The male tang 30 has a substantially square cross-sectional configuration when viewed in a plane transverse, or normal to the axis of rotation 16, as can be seen in the drawings, especially at FIG. 4. In other words, the tang 30 has four flats 31 formed thereon. The flats 31 are parallel to and spaced equidistant from the axis of rotation 16. The transverse distance between opposite parallel flats 31 corresponds to the desired drive size, i.e. half-inch, three-quarter inch, etc.

The tang 30 is adapted for being received in a female receptacle 51, of like configuration and size, which is formed in a tool such as a socket 50 (FIG. 7). The receptacle 51 defines sidewalls 52 and the square cross-sectional configuration of male tang 30 permits the communication of torque from spindle end 12 to the socket 50 via contact between flats 31 and sidewalls 52. The tang 30 may optionally include a retaining means 32 which helps to secure the socket 50 to male tang 30. Those skilled in the art will recognize the illustrated retaining means 32 as being of a split-ring configuration. The split ring retainer 32 is located at the distal end 33 of male tang 30 and is seated in a circumferential groove (not shown) formed therein. The distal end 33 has a generally circular transverse cross-sectional configuration with a diameter substantially equal to the distance between opposing parallel flats 31. The split ring 32 has an outside diameter which is slightly larger than the distance between opposing flats 31. The split ring retainer 32 acts as a compressible spring so that the socket 50 can be forced over male tang 30 for engagement therewith. In the illustrated embodiment of the socket 50, the sidewalls 52 are forced past retainer 32, and the retainer 32 resumes its unstressed configuration to prevent the socket 50 from slipping off the tang 30. It will be recognized that many other different types of socket designs are commonly employed (not shown). Such designs may include a groove in the sidewalls 52 of the socket receptacle 51, which groove receives the retainer 32. Other designs may rely merely on frictional forces between a split ring retainer 32 and the socket receptacle sidewalls 52 to detachably affix the socket 50 to the tang 30. Regardless of the retaining means employed, it is preferable that the distal end 33 of the tang 30 includes a chamfered edge 39 which facilitates the insertion of the tang 30 into the receptacle 51.

In the illustrated embodiment of the invention, the drive engaging means 20 is adapted for engaging a rotary-impact drive means and includes a splined shaft 21 and a pair of anvil ears 22. The drive engaging means 20 engages with an impact mechanism such as those well-known in the art and described in U.S. Pat. No. 3,174,597. The impact mechanism is in turn driven by means such as an air or electric motor. The anvil ears 22 are adapted for receiving hammer blows from the impact mechanism and the energy imparted to anvil ears 22 by the impact mechanism is communicated to male tang 30.

FIGS. 2 and 3 show that in the illustrated embodiment of the spindle end of the invention 12, the torque transfer section 40 includes a cylindrical journal portion 41, one end of which is adjacent the drive engaging means 20, and a transition portion 42. The journal portion 41 is adapted for being received in a journal bearing (not shown) which may be mounted in the housing of a tool drive. Thus, the spindle end 12 is axially supported but free to rotate about axis 16.

The transition portion 42 defines a frustoconical section having a predetermined conical angle, X, with respect to the axis of rotation 16 (FIG. 3). The transition portion 42 is disposed between the tang 30 and journal portion 41. The frustoconical transition portion 42 defines a substantially circular base 43 and a circular truncated apex 44 in respective planes which are transverse, or normal to the axis of rotation 16 and at opposite ends of the transition portion 42 (FIG. 4). However, the transition portion 42 also has four flats 48 formed thereon, each of which flats 48 corresponds to one of the flats 31 formed on the tang 30. The flats 48 on the transition portion 42 are oriented at a predetermined flat angle Z with respect to the axis of rotation 16 (FIG. 2). Thus, the transverse cross-sectional configuration of the transition portion is substantially square at an axial position adjacent the tang 30 and substantially circular at an axial position adjacent the journal portion 41 (FIG. 4).

Figure 9:
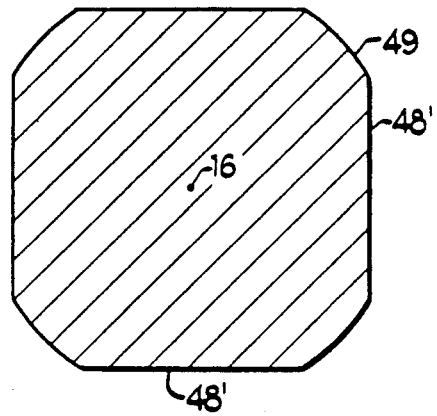
Figure 10:
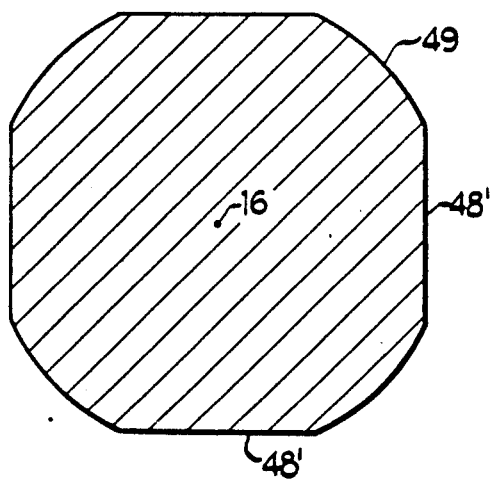

Referring now to FIGS. 8, 9, and 10, in conjunction with FIG. 4, it can be seen how the transverse cross-sectional configuration of the transition portion 42 varies with axial position, intermediate the tang 30 and journal portion 41. FIGS. 8, 9 and 10 show that the intermediate transverse configuration is generally in the shape of a square having sides 48' defined by the flats 48 and arcuate corners 49 defined by the surface of the frustoconical section of the transition portion 42. The length of each side 48' decreases and the radius and the arc length of each arcuate corner 49 increases as the transverse cross-section is taken at successive axial positions moving away from the tang 30 and toward the journal portion 41. Thus, the transverse cross-sectional configuration of the transition portion 42 gradually changes from substantially square to substantially circular.

The spindle end of the invention 12 is preferably fabricated from high quality, hardenable grades of steel such as electric furnace grade 4820. The steel is formed and/or machined to form the splined shaft 21 and anvil ears 22 of the drive engaging means 20, the journal portion 41 and transition portion 42 of the torque transfer section 40 and the male tang 30.

It is preferable that the entire spindle end 12 (except distal end 33), be hardened in accordance with standard metallurgical practice. This practice may include gas carburizing, austenitizing, quenching and tempering. In addition, shot peening of the male tang 30 and transition portion 42 can be used to create residual compressive surface stresses in the finished product. These residual stresses are known in the art to extend fatigue life.

While known methods, such as shot peening, have routinely been used to extend fatigue life, the fatigue resistance of the spindle end of the present invention 12 is attributable, in part, to the use and novel configuration of the transition portion 42 of the torque transfer section 40 and in part to the avoidance of stress concentration due to the contact of the socket 50 with the transition portion 42 by means discussed hereinafter.

Figure 11:
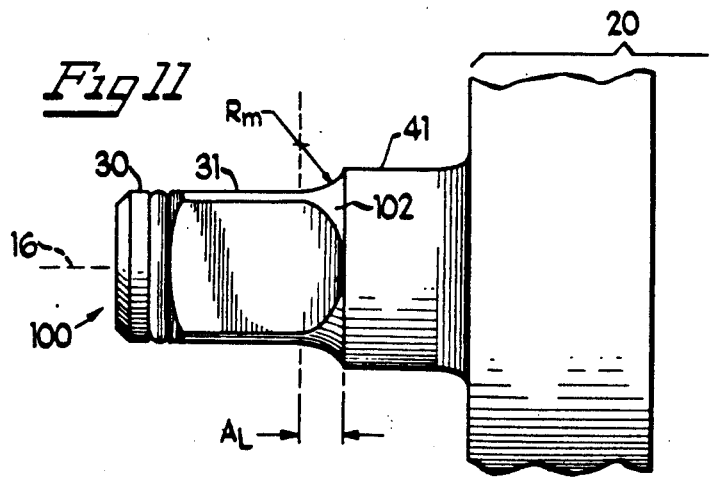
FIG. 11 is an enlarged fragmentary side elevation of a prior art spindle end constructed in accordance with ANSI specification B107.4.

The novel configuration of the transition portion 42 eliminates the sharp discontinuity in geometry which exists at the shoulder between the male tang 30 and journal portion 41 in prior art spindle ends 100 as is shown in FIG. 11. The simple fillet radius 102 on the prior art spindle end 100 is constructed in accordance with ANSI specification B107.4 in an attempt to lessen the stress concentration generated by the aforementioned geometric discontinuity. However, no transition portion is provided which includes a gradual change in geometry from the substantially square transverse cross-sectional configuration of the tang 30 to the circular transverse cross-sectional configuration of the journal portion 41.

ANSI specification B107.4 stipulates a maximum fillet radius, $R_m$, for a given nominal tang size. The radius $R_m$ is measured from a line normal to the axis of rotation 16 and at an axial position defined at the juncture between the end 100, $R_m$ is stipulated to be about 0.188 inch. Thus, if the journal portion 41 has a large enough diameter that the fillet radius 102 extends through a 90° arc, the maximum axial length of the fillet radius, $A_L$, is about 0.188 inch.

In the present invention, the change in geometry between the male tang 30 and the journal portion 41 is gradual, along the axis of rotation 16. The transition portion 42 of the invention retains geometric characteristics from both the tang 30 and journal portion 41, and gradually blends those characteristics without creating sharp discontinuities which may function as stress concentrators to adversely affect the fatigue life of the spindle end 12. Referring now to FIG. 3, it can be seen that the axial length $A_L$ of the transition portion 42 of the spindle end of the invention 12, is substantially longer than the axial length $A_L$ of the prior art spindle end 100, shown in FIG. 11. In accordance with the present invention, it is preferable that the axial length $A_L$ be at least about one-half the nominal tang size, so that the aforementioned change in geometry can occur gradually along the axis of rotation 16.

FIGS. 2 and 4 show that each flat 31 on the tang 30 is formed so as to be normal to each adjacent flat 31 and parallel to each opposite flat 31. It is important to note that the flats 31, as formed on the tang 30, run parallel to the axis of rotation but continue in smooth curvilinear fashion into the flats 48 formed on transition portion 42. Because the orientation of flats 31 and 48 is determined by predetermined flat angle Z (in the illustrated embodiment), the planes defined by the flats 31 and 48 then intersect in a line 36, which line is normal to the axis of rotation 16 and defines a first juncture 36. The smooth curvilinear blending of flats 31 and 48 is provided to eliminate a sharp discontinuity at the first juncture 36. This is carried out in accordance with the invention by providing the first juncture 36 with a first predetermined radius of curvature $R_1$, which can be measured from a point along a line which is normal to the juncture 36 and which bisects the included angle between the corresponding flats 31 and 48, as is shown in FIG. 2.

The four flats 31 on the tang 30, and the corresponding four flats 48 on the transition portion 42, are nonintersecting so as to define four pairs of lands 61 and 68 therebetween, which lands of each pair are respectively associated with the tang 30 and transition portion 42. The lands 61 on the tang 30 are longitudinal in configuration and substantially parallel to the axis of rotation 16. FIG. 3 shows that the lands 61 on the tang 30 also continue in smooth curvilinear fashion into the lands 68 of the transition portion 42. Each pair of lands 61 and 68 thereby defines a pair of lines 62 and 64 (respectively associated with the tang 30 and transition portion 42), by the intersection of the surface of lands 61 and 68 and a plane which is substantially normal to the surface of the lands and which includes the axis of rotation 16. Because FIG. 3 shows the spindle end of the invention 12 oriented about the axis of rotation 16 so that flats 31 are oriented at 45° with respect to the plane of the drawings, lines 62 and 64 are coincident with the outline of male tang 30 and transition portion 42. Likewise in FIG. 3, the projection of lines 62 and 64 associated with the centermost pair of lands 61 and 68, may be viewed as being coincident with the axis of rotation 16. Because lands 61 and 68 comprise cylindrical and frustoconical sections, as respectively associated with tang 30 and transition portion 42, lines 62 and 64 may be defined as merely lying on the surface of one pair of corresponding lands 61 and 68 and being coplanar with the axis of rotation 16.

FIG. 3 further shows that lines 62 and 64 intersect and thereby define a second juncture 63, which second juncture 63 has a second predetermined radius of curvature $R_2$ to provide a smooth curvilinear transition between the lands 61 and 68 of each pair. The second radius of curvature is measured from a point along a further line, which further line is contained in the plane of the lines 62 and 64 and which bisects the included angle between lines 62 and 64, as illustrated.

It should be noted that the first juncture 36 and the second juncture 63 are not necessarily coplanar. This is because the location of junctures 36 and 63, with respect to the longitudinal position along axis of rotation 16, depends upon the magnitudes of predetermined flat angle Z and predetermined conical angle X, respectively. This condition is clearly visible in FIG. 3 which shows second juncture 63 as being located slightly closer to the distal end 33 of tang 30 than first juncture 36.

In accordance with the invention, the magnitude of predetermined conical angle X and predetermined flat angle Z may be varied. Clearly, higher values for X and Z render steeper slopes through the transition portion 42. At the extreme, X and Z would be at 90° with respect to the axis of rotation 16 and the transition portion 42 would be substantially eliminated, resulting in a spindle end configuration resembling the prior art without a fillet at the shoulder between the journal portion 41 and tang 30 (Cf. FIG. 11). Thus, predetermined conical angle X and predetermined flat angle Z are limited to such values less than 90° wherein a significant increase in fatigue life over the prior art is realized.

At the opposite extreme, the values of X and Z approach zero degrees. At extremely low values of X and Z, the transition portion 42 of the spindle end of the invention must be made impractically long. It is desirable to maintain the overall length of the spindle end short enough so that the load, or torque which experienced during use, does not result in substantial torsional elastic deformation or "twist" about the axis of rotation. Thus, for the purpose of the fatigue tests reported herein, spindle ends were constructed in accordance with the invention but having a lower limit for values of X and Z of about 10°. Thus, in accordance with the present invention, the values of X and Z, the predetermined conical angle and the predetermined flat angle respectively, are greater than such values as result in unacceptable twist and less than 90° so that a significant increase in fatigue life (as compared to prior art spindle ends), at a given stress level, is realized.

Numerous fatigue tests were conducted to determine the optimum values for X and Z, the predetermined conical angle and flat angle. Several specimens having specially configured drive engaging means which permitted mounting in a torsional load fatigue testing device were constructed. The specimens had predetermined conical angles X at 10° and 20° and predetermined flat angles Z at 10° and 20°, and combinations thereof. Those specimens were then fatigue tested and the results analyzed.

It was expected that the spindle ends having the lowest values for X and Z would exhibit the greatest fatigue life. General fatigue theory predicts that the least severity in geometric discontinuity, which would be embodied by the lowest values of angles X and Z in the transition portion 42, would yield the greatest fatigue life. Surprisingly, the optimum configuration for the spindle ends of the invention 12 was found to include a combination of a predetermined conical angle X of about 10° and a predetermined flat angle Z of about 20°.

Several fatigue tests were thereafter conducted at various stress levels, on one-half inch drive spindle ends constructed with the optimum conical and flat angle configuration. As a control, additional specimens were constructed in accordance with the prior art design of spindle ends, as shown in FIG. 11. These control spindle ends were also fatigue tested (at the same stress levels) and the results compared to that obtained for the spindle ends of the invention. With an applied (cyclic) torque of about 2,500 lb.-in., the mean fatigue life of the spindle end of the invention 12 was 83% greater than the mean life of the prior art designs. At a torque of 3,500 lb.-in., the mean fatigue life increased 101% and at 4,500 lb.-in., the mean fatigue life increased 124%.

It is also preferable that the predetermined radii, $R_1$ and $R_2$, be maintained as large as is practically possible for the given axial length of the tang 20 and transition portion 42. Small values for $R_1$ and $R_2$ can result in sharp discontinuities which may function as a stress concentrator. For the fatigue tests reported herein, values of $R_1$ and $R_2$ were maintained at one-half inch. This value provided a gentle enough radius at the first and second junctures 36 and 63 so that no fatigue failures were observed to have initiated at those sites. Nevertheless, a value of one-half inch is small enough so that machining of the radii does not extend an undue distance over the surfaces of the tang 20 and transition portion 42.

Referring now to FIGS. 5 through 7, there is illustrated another embodiment of the spindle end of the invention 12 which includes tool engagement stop means that avoids stress concentration due to contact of the socket 50 with the transition portion 42. The stop means includes a barrel portion 70 which is typically press fit on a specially formed journal portion 46 and which may cooperate with a shoulder 47 formed in the torque transfer section 40 of the spindle end of the invention 12. The shoulder 47 is added by slightly reducing the diameter of journal portion 41 at 46. The reduced diameter at 46 is substantially equal to the circular base 44 defined by frustoconical transition portion 42. It is preferable that barrel portion 70 include a chamfered edge 72 and that the angle of chamfered edge 72 and shoulder 47 be mated. It will be understood that shoulder 47 and edge 72 may also be provided with mated radii of curvature.

The barrel portion 70 prevents a socket 50, which is received on the tang 30, from engaging the transition portion 42. In many prior art spindle ends, the fillet provided between the tang and journal portion of the spindle end also serves to act as a stop for the socket. Because the fillet presents a slight taper, and because the female receptacle in the socket is necessarily somewhat larger than the dimension of the tang it receives, the sockets have a tendency to "ride up" the fillet. Thus, the fillet bears an inordinate amount of the load applied by the tang. In other words, the area of engagement between the socket and prior art spindle end is quite small, concentrated at the fillet. Repeated use quickly causes the formation of a notch at the fillet. This notch readily serves as an initiation site for a fatigue fracture.

In this embodiment of the invention, as illustrated in FIG. 7, the socket 50 is prevented from engaging the transition portion 42, and particularly from engaging junctures 36 and 63, by virtue of barrel portion 70. Thus, the area of engagement between the flats 31 of the male tang 30 and the sidewalls 52 of the female receptacle 51 of the socket 50, causes the load from the driving torque to be distributed over a very large area of the tang 30. In this manner, the stop means of the invention prevents the formation of notches in the transition portion 42. The length of tang 30 and barrel portion 70, and location of shoulder 47, all as measured along the axis of rotation 16, are predetermined to cooperate in locating the area of engagement between the tang 30 and socket 50.

In the above-described embodiment of the invention, the barrel portion 70 of the stop means rotates with the elongated body 14. It will be understood that stop means, in the form of a barrel which engages a shoulder on a tool drive housing, and which barrel portion has an inside diameter greater than the journal portion 41 and transition portion 42, so that the barrel portion 70 may remain stationary with respect to the elongated body 14, also falls within the scope of the invention.

It should be noted that slight deviations in the configuration of flats 48 and lands 61 and 68, from the exact geometrically defined shapes in the illustrated embodiment 12, still fall within the scope of the invention. For instance, the lands 61 on the tang 30 have been illustrated herein as defining cylindrical sections. This configuration results from manufacture of the spindle end 12 by turning on a lathe. Nonetheless, it will be recognized that forming lands 61 as a flat surface will still fall within the scope of the invention, so long as lands 61 continue in smooth curvilinear fashion into the surface of lands 68 on the frustoconical surface of the transition portion 42.

The fatigue resistance of the spindle end of the invention is due in part to the gentle, smooth transition in geometry, provided by the transition portion 42, between the tang 30 and journal portion 41. Thus, it is necessary that the transition portion 42 blend the geometric characteristics of the tang 30 and journal portion 41. The frustoconical shape of transition portion lands 68 provides a gentle reduction in dimension from the diameter of the journal portion 41 to the transverse distance between diagonally opposing lands 61 on the tang 30. Likewise, the flats 31 on the tang 30 continue into the transition portion 42 in a smooth fashion, blending into flats 48 which are gradually diminished and finally eliminated to leave the journal portion in a fully cylindrical condition. Thus, it is not necessary that the flats 48 on the transition portion 42 be planar in configuration as has been described in connection with the illustrated embodiment. It is only necessary that the transverse cross-sectional configuration of the transition portion 42 gradually change from substantially square to substantially circular as the axial position of the cross section is moved away from the tang 30 and toward the journal portion 42. This could also be accomplished by providing flats 48 on the transition portion 42 which have a curved rather than a planar configuration.

The invention consists of certain novel features and a combination of parts, previously described, illustrated in the drawings, and particularly pointed out in the appended claims. While there has been described what is, at present, considered to be a preferred embodiment, it will be understood that various changes in the details may be made without departing from the spirit, or sacrificing any of the advantages of the invention.

What is claimed is:

1. A fatigue-resistant spindle end for rotary tool drives being an elongated body having a longitudinal axis of rotation and comprising:

a drive engaging means for engaging a rotary drive means at one end of said body;

a male tool engaging tang at the other end of said body;

a torque transfer section disposed between said drive engaging means and said male tang;

said torque transfer section and said male tang being integrally formed, coaxially disposed and exhibiting fourfold symmetry about said axis of rotation;

said torque transfer section including a cylindrical journal portion and a frustoconical transition portion;

said transition portion being disposed between said journal portion and said male tang;

said male tang having a generally square cross-sectional configuration, transverse to said axis of rotation;

said male tang having a predetermined nominal size defined by said square cross-sectional configuration;

said transition portion having four non-intersecting planar flats formed thereon; and said transition portion having a cross-sectional configuration, transverse to said axis of rotation, which varies with axial position from substantially square adjacent said tang to substantially circular adjacent said journal portion.

2. The fatigue resistant spindle end for rotatary tool drives of claim 1, wherein said transverse cross-sectional configuration of said transition portion at an axial position intermediate said tang and said journal portion is a generally square shape having arcuate corners, which generally square shape defines four sides of equal length and four arcuate corners of equal radius and arc length.

3. The fatigue-resistant spindle end for rotary-tool drives of claim 1, wherein said drive engaging means includes anvil means for engaging an impact mechanism.

4. The fatigue-resistant spindle end for rotary tool drives of claim 3, wherein said anvil means include a pair of ears, said ears being formed so as to exhibit at least two-fold symmetry about the axis of rotation.

5. The fatigue-resistant spindle end for rotary tool drives of claim 1, wherein said elongated body is fabricated from an electric furnace grade, hardenable steel.

6. The fatigue-resistant spindle end for rotary tool drives of claim 5, wherein said electric furnace grade steel is 4820.

7. The fatigue-resistant spindle end for rotary tool drives of claim 5, wherein said electric furnace grade, steel is subjected to carburization, austenitization, quenching and tempering.

8. The fatigue-resistant spindle end for rotary tool drives of claim 1, and further comprising stop means for preventing a socket or the like from engaging said transition portion.

9. The fatigue-resistant spindle end for rotary tool drives of claim 8, wherein said stop means includes a barrel portion adapted for engaging a shoulder formed on said journal portion.

10. The fatigue-resistant spindle end for rotary tool drives of claim 8, wherein said stop means is press-fitted to said elongated body.

11. The fatigue-resistant angle end for rotary tool drives of claim 1, wherein said transition portion has an axial length greater than or equal to about one-half said predetermined nominal tang size.

12. A fatigue-resistant spindle end for rotary tool drives being an elongated body having a longitudinal axis of rotation and comprising:

a drive engaging means for engaging a rotary drive means at one end of said body;

a male tool engaging tang at the other end of said body;

a torque transfer section disposed between said drive engaging means and said male tang;

said torque transfer section and said male tang being integrally formed coaxially disposed and exhibiting fourfold symmetry about said axis of rotation;

said torque transfer section including a cylindrical journal portion and a frustoconical transition portion having a predetermined conical angle X, with respect to the axis of rotation;

said transition portion being disposed between said journal portion and said male tang;

said male tang and said transition portion having four nonintersecting planar flats formed thereon which flats define four lands therebetween;

said flats and said lands on said tang continuing onto said transition portion in smooth curvilinear fashion;

said male tang having a substantially square cross-sectional configuration, transverse to said axis of rotation, said square cross-sectional configuration having sides defined by said flats;

said transition portion having a cross-sectional configuration, transverse to said axis of rotation, which varies with axial position; and said transverse cross-sectional configuration of said transition portion varying from substantially square at an axial position adjacent said tang to substantially circular at an axial position adjacent said journal portion.

13. The fatigue-resistant spindle end for rotary-tool drives of claim 12, wherein said drive engaging means includes anvil means for engaging an impact mechanism.

14. The fatigue-resistant spindle end for rotary tool drives of claim 13, wherein said anvil means include a pair of ears, said ears being formed so as to exhibit at least two-fold symmetry about the axis of rotation.

15. The fatigue-resistant spindle end for rotary tool drives of claim 12, wherein said predetermined conical angle X is about 10 to about 20.

16. The fatigue-resistant spindle end for rotary tool drives of claim 12, wherein said predetermined conical angle X is low enough to provide a substantial increase in fatigue life as compared to a spindle end of like nominal dimensions and material fabricated in accordance with ANSI specification B107.4 but great enough to prevent substantial torsional elastic deformation of the elongated body in use.

17. The fatigue-resistant spindle end for rotary tool drives of claim 12, wherein said elongated body is fabricated from an electric furnace grade, hardenable steel.

18. The fatigue-resistant spindle end for rotary tool drives of claim 17, wherein said electric furnace grade steel is 4820.

19. The fatigue-resistant spindle end for rotary tool drives of claim 17, wherein said electric furnace grade, steel is subjected to carburization, austenitization, quenching and tempering.

20. The fatigue-resistant spindle end for rotary tool drives of claim 12, and further comprising stop means for preventing a socket or the like from engaging said transition portion.

21. The fatigue-resistant spindle end for rotary tool drives of claim 20, wherein said spindle end exhibits a fatigue life at a given stress level which is about 75-100% greater than the fatigue life exhibited by a spindle end of like nominal dimensions and material fabricated in accordance with ANSI specification B107.4.

22. The fatigue-resistant spindle end for rotary tool drives of claim 20, wherein said stop means includes a barrel portion adapted for engaging a shoulder formed on said journal portion.

23. The fatigue-resistant spindle end for rotary tool drives of claim 20, wherein said stop means is press-fitted to said elongated body.

24. A fatigue-resistant spindle end for rotary tool drives being an elongated body having a longitudinal axis of rotation and comprising:

a drive engaging means for engaging a rotary drive means at one end of said body;

a male tool engaging tang at the other end of said body;

a torque transfer section disposed between said drive engaging means and said male tang;

said torque transfer section and said male tang being integrally formed, coaxially disposed and exhibiting at least two-fold symmetry about said axis of rotation;

said torque transfer section including a cylindrical journal portion and a frustoconical transition portion;

said frustoconical transition portion having a predetermined conical angle X, with respect to the axis of rotation;

said transition portion being disposed between said journal portion and said male tang;

said male tang having a generally square, cross-sectioned configuration normal to the axis of rotation, thereby defining four flats formed thereon;

said transition portion having four substantially planar flats formed thereon, each of said flats corresponding to one of said flats defined on said tang;

said flats on said transition portion being oriented at a predetermined flat angle Z, with respect to the axis of rotation;

said flats on said tang continuing in smooth curvilinear fashion into said flats on said transition portion thereby defining a first juncture having a first predetermined radius of curvature $R_1$;

said flats on said tang and transition portion being non-intersecting and defining four pairs of lands therebetween, the lands of each pair being respectively associated with the tang and transition portion; and said lands associated with said tang continuing in smooth curvilinear fashion into said lands associated with said transition portion thereby defining a second juncture having a second predetermined radius of curvature $R_2$.

25. The fatigue-resistant spindle end for rotary-tool drives of claim 24, wherein said drive engaging means includes anvil means for engaging an impact mechanism.

26. The fatigue-resistant spindle end for rotary tool drives of claim 25, wherein said anvil means include a pair of ears, said ears being formed so as to exhibit at least two-fold symmetry about the axis of rotation.

27. The fatigue-resistant spindle end for rotary tool drives of claim 24, wherein each of said predetermined radii $R_1$ and $R_2$ is about one-half inch.

28. The fatigue-resistant spindle end for rotary tool drives of claim 24, wherein said predetermined conical angle X and said predetermined flat angle Z are low enough to provide a substantial increase in fatigue life as compared to a spindle end of like nominal dimensions and material fabricated in accordance with ANSI specification B107.4 but great enough to prevent substantial torsional elastic formation of the elongated body in use.

29. The fatigue-resistant spindle end for rotary tool drives of claim 28, wherein said predetermined conical angle X and said predetermined flat angle Z are between about 10° and about 20°.

30. The fatigue-resistant spindle end for rotary tool drives of claim 28, wherein said predetermined conical angle X is about 10° and said predetermined flat angle Z is about 20°.

31. The fatigue-resistant spindle end for rotary tool drives of claim 24, wherein said elongated body is fabricated from an electric furnace grade, hardenable steel.

32. The fatigue-resistant spindle end for rotary tool drives of claim 31, wherein said electric furnace grade steel is 4820.

33. The fatigue-resistant spindle end for rotary tool drives of claim 31, wherein said electric furnace grade steel is subjected to carburization, austenitization, quenching and tempering.

34. The fatigue-resistant spindle end for rotary tool drives of claim 24 and further comprising stop means for preventing a socket or the like from engaging said transition portion.

35. The fatigue-resistant spindle end for rotary tool drives of claim 34, wherein said spindle end exhibits a fatigue life at a given stress level which is about 75-100% greater than the fatigue life exhibited by a spindle end of like nominal dimensions and material fabricated in accordance with ANSI specification B107.4.

36. The fatigue-resistant spindle end for rotary tool drives of claim 34, wherein said stop means includes a barrel portion adapted for engaging a shoulder formed on said elongated body.

37. The fatigue-resistant spindle end for rotary tool drives of claim 34, wherein said stop means is press-fitted to said spindle end.

* * * * *